Dec. 8, 1964 V. BIGGI ETAL 3,160,813

TROPOSPHERIC RADIO COMMUNICATION SYSTEM

Filed June 17, 1960 4 Sheets-Sheet 1

Dec. 8, 1964 V. BIGGI ETAL 3,160,813

TROPOSPHERIC RADIO COMMUNICATION SYSTEM

Filed June 17, 1960 4 Sheets-Sheet 3

TROPOSPHERIC RADIO COMMUNICATION SYSTEM

Filed June 17, 1960

United States Patent Office 3,160,813

Patented Dec. 8, 1964

3,160,813

TROPOSPHERIC RADIO COMMUNICATION SYSTEM

Victor Biggi and Jean Claude Simon, Paris, France, assignors to Compagnie Generale de Telegraphie Sans Fil, a corporation of France Filed June 17, 1960, Ser. No. 36,952
Claims priority, application France, July 2, 1959, 799,131
6 Claims. (Cl. 325—58)

Tropospheric propagation makes it possible to transmit information on frequencies comprised between a few tens and several thousands mc./s, over distances exceeding by far the line of sight range. Unfortunately, the very nature of the tropospheric propagation makes that, for a given frequency, the field intensity at the receiver end varies very rapidly and within broad limits.

In order to palliate this inconvenience, in addition to using powerful transmitters (10 kw. at least) and high-gain, and therefore bulky, aerials, various diversity methods are employed, to wit, the frequency diversity method, consisting in simulatneously transmitting and receiving the same information on several frequencies, and the position diversity, which consists in using several aerials, spaced a certain distance apart, both at the transmission and the reception ends. Generally, both diversity methods are used simultaneously, thus involving the use of complex and costly equipments.

It is an object of the present invention to provide a tropospheric radio link system which is more simple and more economical than those usually employed.

The system acocrding to the invention makes use of the field intensity variations due to the tropospheric propagation.

According to an essential feature of the system, a reception and transmission equipment is provided which is adapted for simultaneously sweeping the available frequency band and determining the frequency ensuring the signal transmission under the best conditions.

According to a preferred embodiment of the invention, the same transmitter and receiver are used for alternately transmitting and receiving the information and sweeping the frequency band. The system thus operates according to a two-phase cycle. During a first phase, the transmitter and the receiver sweep in synchronism the frequency band, the receiver having means for determining what frequency is the most suitable for the transmission. The receiver then indicates this frequency to the transmitter through a return channel. During a second phase, which is about one hundred times longer than the first one and lasts about 1/10 of a second, the transmitter and the receiver operate on the frequency selected and ensure the transmission of the information on this frequency. This cycle is repeated continuously.

Preferably, the return channel is one of the channels of the equipment ensuring the communication in the direction opposite to that of the information transmission concerned.

The invention will be best understood from the following description and appended drawing, wherein.

In the system to be described, a "Carcinotron" tube, for example of the M type, is used in the transmitter as the transmitter oscillator and a "Carcinotron" tube, for example of the O type, is used as a local oscillator in the receiver. As is well known, "Carcinotron" tubes are tunable in a wide frequency band, the tuning being performed by varying the voltage applied to the tuning electrodes.

Both the transmitter and the local oscillator or periodically frequency modulated by a composite signal: the frequency sweeps during a time interval $t$ a predetermined frequency band, under the control of synchronizing signals which initiate and stop this sweeping, and takes a fixed value during the time interval T which follows, this value having been selected during the period $t$ which preceded the last period $t$.

Figure 1:
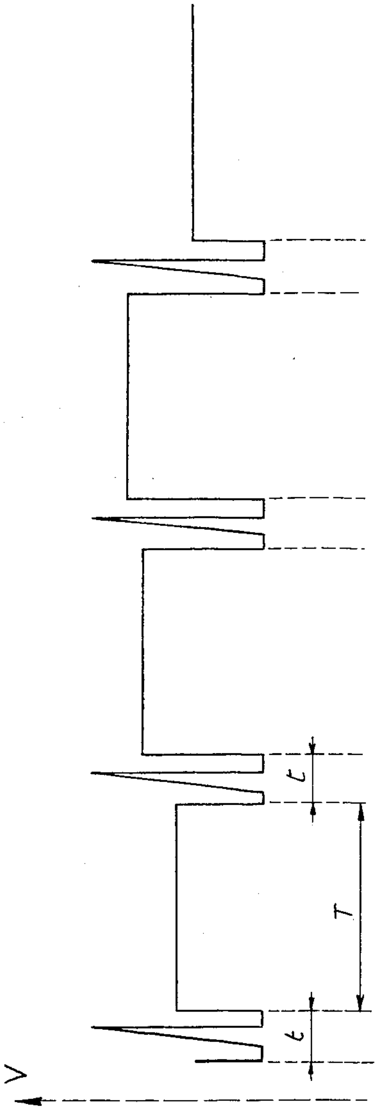
FIGURE 1 illustrates the modulating voltage applied to the transmitter and to the receiver local oscillator tubes.

Accordingly, the voltage applied to the "Carcinotron" tubes may have the shape shown in FIG. 1. As to the information modulated signals, they will have the shape shown in FIG. 2. The transmission of the information will thus take place during discrete time intervals T which are separated from each other by rest intervals $t$.

At the end of each interval T, the transmitter reverts to a predetermined frequency $f$ which has been selected once for all. This may be, for example, the lower limit of the frequency band explored during intervals $t$. At the same instant, the receiver, or more precisely, its local oscillator, is reset to a frequency which is separated from frequency $f$, by a value equal to the intermediate frequency of the receiver, assuming the latter to be of the heterodyne type.

At the start of interval $t$ the transmitter and the receiver assume the lowest frequency of the band to be explored. Then follows the sweeping period during which the transmitter frequency and the local receiver frequency linearly sweep the whole of the frequency band. During this sweeping, the receiver registers the field intensity, or the signal-to-noise ratio in order to make it possible to ascertain the value of the frequency for which the received signal level was the highest.

When the upper limit of the explored frequency band has been reached, the frequency of the transmitter and the frequency of the receiver local oscillator return to the lower limit of the band.

Interval $t$ is thus terminated. During the interval T which follows, the transmitter and the receiver local oscillator are adjusted to operate on the most advantageous frequency among those which have occurred during the scanning interval $t$ which preceded the last one.

In other words, each interval $t$ is used for selecting at the receiver end the most advantageous frequency among those which had occurred during the last sweeping interval $t$ and for indicating this frequency to the transmitter and to the receiver local oscillator. Thus, the transmitter will operate at this frequency during the next interval T which follows the next one, while during the interval $t$ intervening between the two intervals T considered, a further sweeping of the available frequency band will take place.

Figure 3:
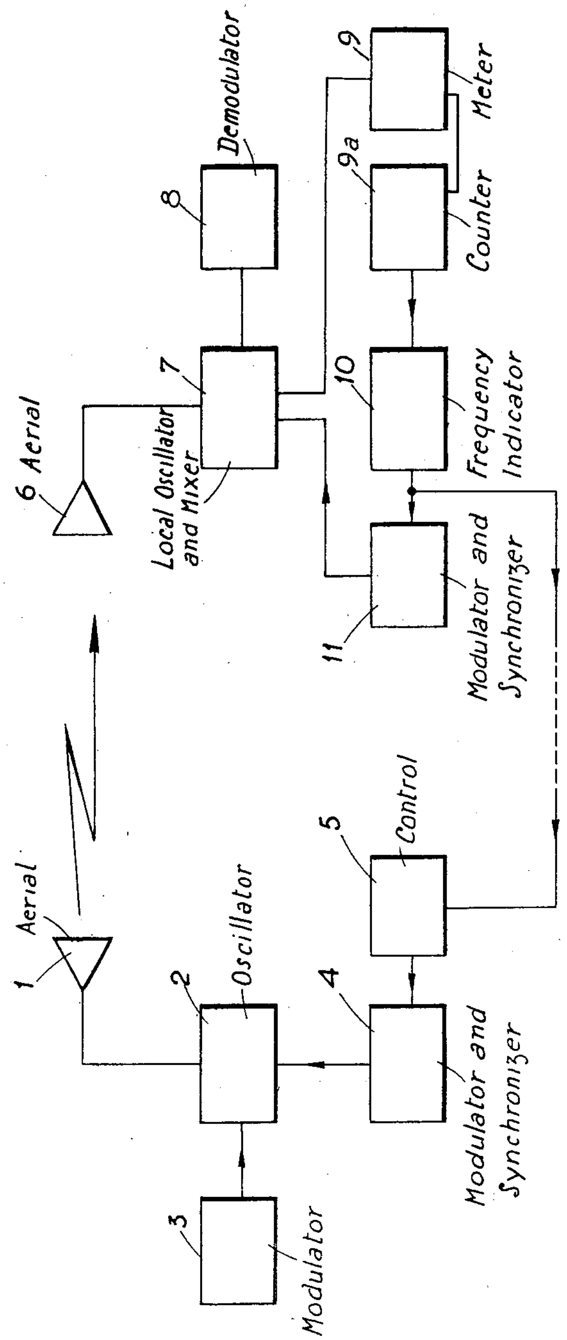
FIGURES 3 and 5 are block diagrams of one way tropospheric radio link systems according to the invention.

FIG. 3 shows the general arrangement of a radio link according to the invention.

In this figure, the transmission station comprises an aerial 1 fed by a power tube 2, such as, for example, a "Carcinotron–M" tube, which receives the information to be transmitted through a modulator 3. A modulator and synchronizer 4 ensures the frequency modulation of "Carcinotron" 2, according to the pattern of the invention. It may be of the type used in television techniques for ensuring the various scannings.

The receiver station comprises an aerial 6, a local oscillator and mixer assembly 7 including, for example, a "Carcinotron O" tube, which serves as a local oscillator, and a demodulator 8 for deriving the information from the received signal.

According to the invention, the output of the local oscillator and mixer assembly 7, is connected to a meter system 9 of any known type, which measures and registers the quality of the transmission as a function of the operating frequency, during the sweeping intervals *t*. This device notes the maximum amplitude of the received signal and the instant when this amplitude is reached, which indicates the modulation voltage corresponding to said instant and the corresponding frequency, since the variation of the frequency or of the modulating voltage as a function of time is known. The optimum transmission frequency is thus selected. This meter system may, for example, comprise a peak voltmeter 9 to which is associated a counter 9*a*, for example of the electronic type. This counter starts counting at the beginning of each time interval *t*. Each time the voltage measured by voltmeter 9 passes a peak, counter 9*a* is reset to zero and starts counting again. Once the maximum peak voltage has been reached, counter 9*a* counts without further interruptions until the end of the time interval *t* in progress and thus indicates the time at which the peak voltage occurred, this indicating the optimum transmission frequency.

A frequency indicator 10 transmits to frequency control device 5 the necessary information as to the selected frequency, for example, by means of a coding system.

Devices 5 and 10 simultaneously control modulator and synchronizing devices 4 and 11 respectively, thus determining the frequency of the receiver local oscillator and of the transmitter.

The frequency sweeping of the local oscillator 7 and of the transmitter oscillator 2 are thus synchronized, it being understood that there is between these frequencies a difference equal to the intermediate frequency. These synchronizing devices are quite similar in their operation principle to those used in television to ensure the synchronism between transmitter and receiver.

In other words, devices 4 and 11 apply to Carcinotron tubes 2 and 7 a modulating voltage in accordance with the pattern of FIG. 1. They must be in phase. This may be readily obtained, for example, by deriving synchronizing signals from a sinusoid by means of a counter and frequency divider; this pure sinusoid, the frequency of which is very stable, will be produced both at the transmission and reception ends. The phase adjustment may be effected, at the receiver end, by means of a comparator the action of which may be quite slow, on account of the inertia due to the frequency stability.

Figure 4:
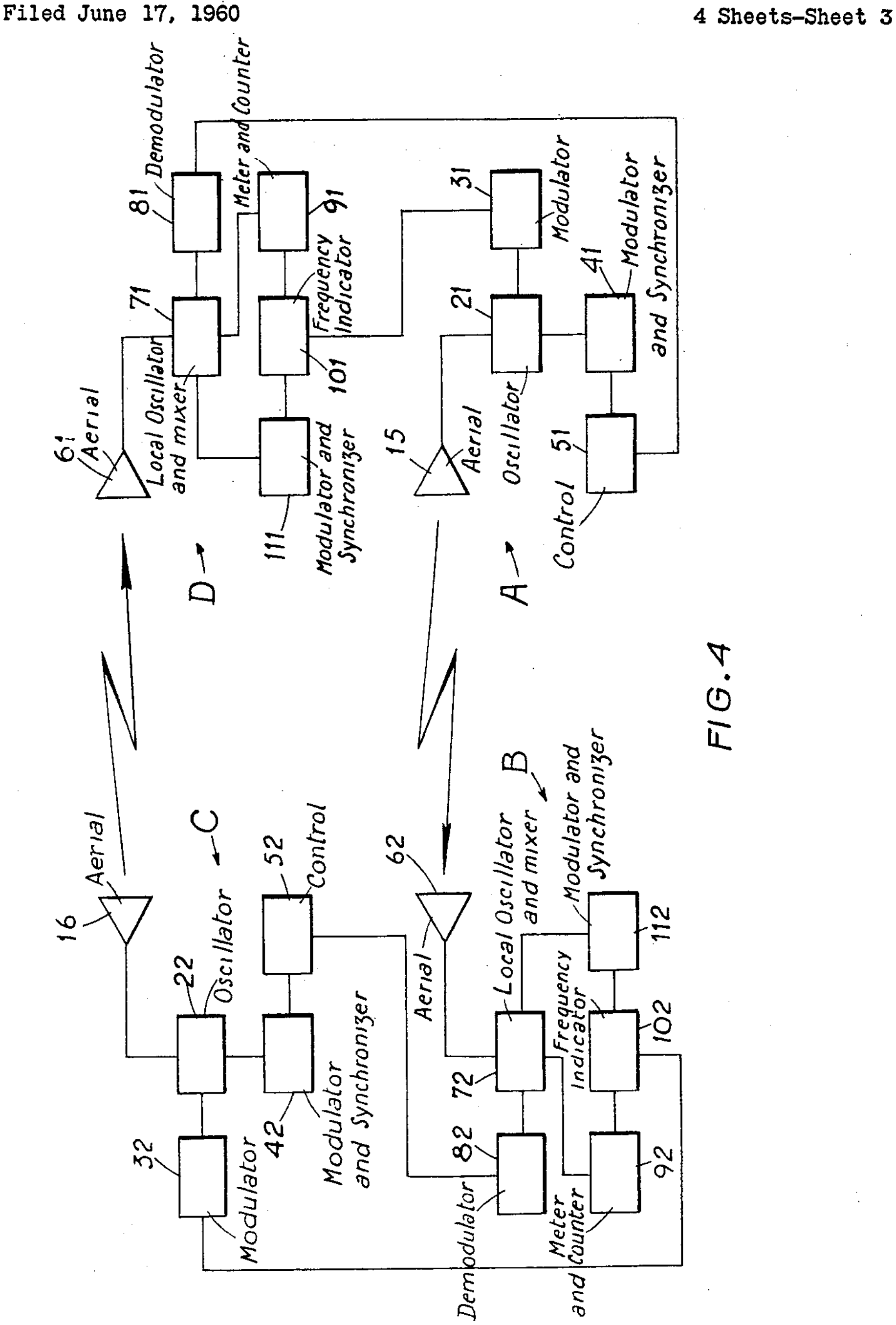
FIGURE 4 is a block diagram of a two-way tropospheric radio link system according to the invention.

FIG. 4 shows a two-way radio link according to the invention. It comprises two similar stations, each having a transmitter A or C and a receiver B or D respectively, similar to those of FIG. 3 for ensuring the reception and the transmission in both directions.

The transmitter shown in the right hand portion of the drawing comprises: an aerial 15, an oscillator 21, which is modulated by a modulator 31, a synchronizer and modulator device 41 and a control device 51 which receives the frequency indication from the receiver. The receiver comprises a local oscillator and mixer 71, a demodulator 81, a meter 91, an indicator 101 and a modulator and synchronizer 111. Demodulator 81 is coupled to the control device 51, the former transmitting to the latter the information as to the selected frequency, received from receiver B through transmitter G.

Modulator 31 receives in the same manner from indicator 101 the information as to the frequency selected at receiver D and transmits it to transmitter C, through receiver B.

The elements building up transmitter C and receiver B carry the same reference numerals as those building up transmitter A and receiver B respectively, these numbers having been increased by one unity.

The ratio $T/t$ may be of the order of one hundred, with *t* being, for example, equal to 0.002 and T to 0.2 seconds. This corresponds for the channels selected to a live duration of the order of 0.4 sec.

By selecting the transmission frequency in accordance with the invention, the quality of the link may be greatly improved, say by 20 db for instance. Accordingly, while obtaining an equal or even a higher transmission quality, less powerful transmitters and less space consuming aerials may be used. The energy used may be readily reduced by a ratio of 10. A transmitter of 1 kw. may thus be substituted for a transmitter of 10 kw., which is a considerable advantage. The diameter of the aerials may be divided by a factor of two or three, which reduces the costs considerably in view of the economy in space.

Figure 2:
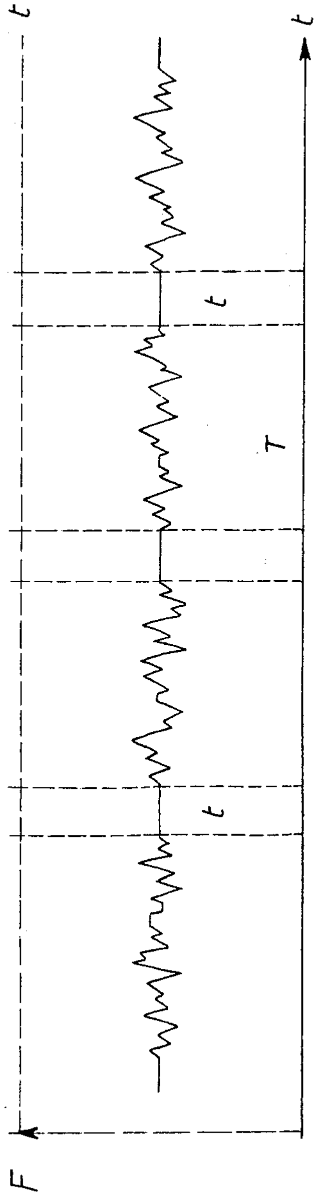
FIGURE 2 illustrates the information modulated output signal of the transmitter.

It is to be noted that, as shown in FIGS. 1 and 2, information is transmitted only during intervals T. Between these intervals, i.e. during intervals *t*, no information is transmitted. This is, of course, not a disadvantage, neither in the case of television nor in the case of radiotelephony. In the case of radio-telegraphy, it will be necessary to ensure synchronism between the transmission of information and the frequency sweeping, which is not considered a problem.

Figure 5:
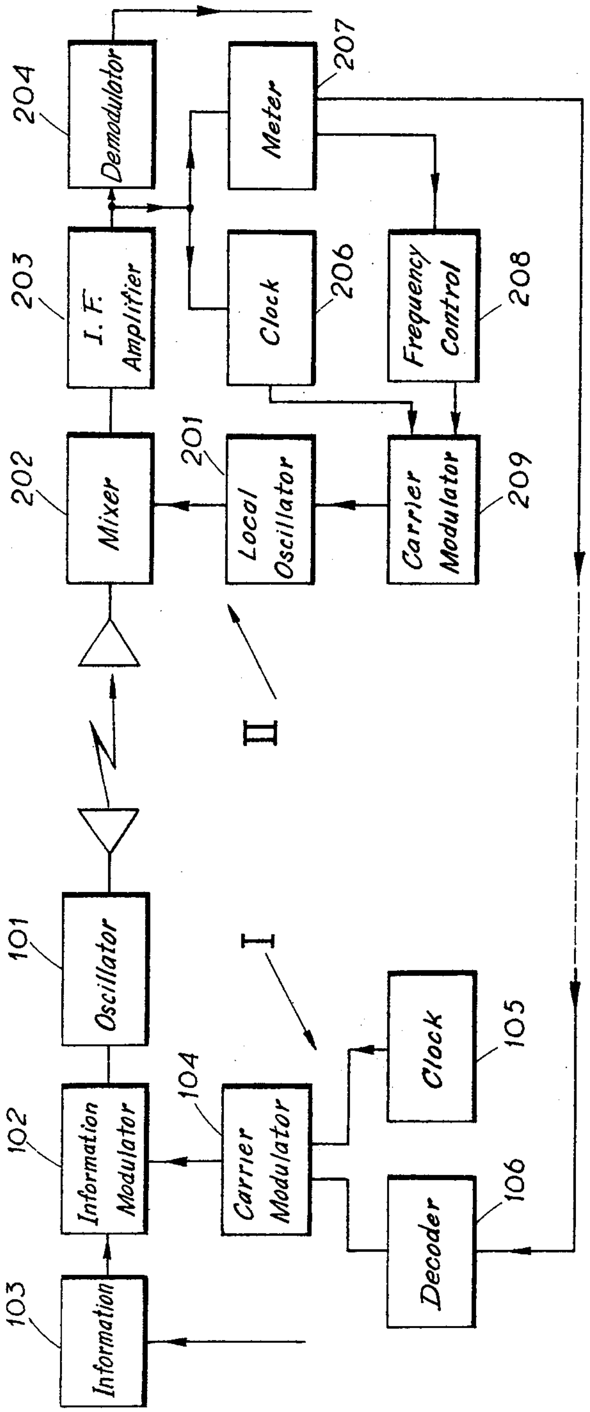

FIG. 5 is another illustration of the invention, where only one transmitter I and only one receiver II are shown, in the same manner as in FIG. 3.

Transmitter I comprises an oscillator 101, which is tunable within a broad frequency band, for example a "Carcinotron" oscillator. Oscillator 101 is frequency modulated by a modulator 102, which receives from stages 103 the modulating information. During time intervals *t*, oscillator 101 is frequency modulated by a carrier modulator 104. Modulator 104 is controlled by a clock 105, which may be stabilized by a quartz crystal, and provides a cyclically varying modulating voltage, for example, a saw tooth voltage.

A decoder device 106 receives from receiver II the information as to the carrier frequency selected.

Receiver II comprises a local oscillator 201, a mixer 202, an intermediate frequency amplifier 203 and a demodulator 204. A clock 206, the frequency of which is tied to the frequency of clock 105 by means of signals transmitted by transmitter I, provides in the same way as clock 105 a modulating voltage which controls a carrier modulator 209. Modulator 209 modulates the local oscillator 201 during time intervals *t*. A meter 207, for example a peak voltmeter, operating as described with reference to FIG. 3, selects the optimum frequency during time intervals *t*. A frequency control device 208 applies this frequency to the carrier modulator 209. In addition, the frequency information provided by meter 207 is coded and transmitted to decoder 106, in the same manner as in FIG. 4.

Of course the invention is not limited to the embodiments described and shown which were given solely by way of example.

What is claimed is:

1. A tropospheric radio link comprising: a transmitter for transmitting a signal having a carrier frequency; means for cyclically tuning said frequency to sweep a predetermined frequency band during first periodically repeated time intervals and to be clamped to one of the frequency values comprised in said frequency band during second periodically repeated time intervals said first and second intervals having respectively fixed first and second durations *t* and T separating two consecutive first time intervals; a receiver for receiving said signal; means for measuring the amplitude of said received signal during said first intervals and for determining the frequency corresponding to the peak amplitude of said signal; means for making said one frequency equal to said last mentioned frequency; and means for constantly tuning said receiver to said transmitter.

2. A tropospheric radio link comprising: a transmitter for transmitting a signal having a carrier frequency; means for cyclically tuning said frequency to sweep a predetermined frequency band during first periodically repeated time intervals and to be constantly equal to one of the frequencies comprised in said frequency band during second periodically repeated time intervals said first and second intervals having respectively fixed first and second durations $t$ and T separating two consecutive first time intervals; a receiver for receiving said signal; means for tuning said receiver to said transmitter during said first time intervals; means in said receiver for measuring the amplitude of said received signal during said first intervals and for determining the frequency corresponding to the peak amplitude of said signal; a return channel, between said transmitter and said receiver, for transmitting to said transmitter, information about said peak amplitude frequency and means for tuning said transmitter and said receiver, to said peak amplitude frequency during said second intervals.

3. A tropospheric radio link comprising: a transmitter for transmitting a signal having a carrier frequency; means for cyclically tuning said frequency to sweep a predetermined frequency band during first periodically repeated time intervals according to a predetermined law and to be constantly equal to one of the frequencies comprised in said frequency band during second periodically repeated time intervals separating two consecutive first time intervals said first and second intervals having respectively fixed first and second durations $t$ and T; a receiver for receiving said signal; means for tuning said receiver to said transmitter during said first time intervals; a peak voltmeter associated with said receiver for measuring the peak amplitude of said received signal during said first time intervals; means for measuring the frequency corresponding to said peak amplitude; means for generating an information signal corresponding to said peak amplitude frequency; a return channel for transmitting said information signal; means associated with said transmitter for receiving said signal; and synchronizing means in said receiver and in said transmitter for tuning said receiver and said transmitter to said peak amplitude frequency during said second time intervals.

4. A tropospheric radio link comprising: a transmitter for transmitting a signal having a carrier frequency; a receiver for receiving said signal; a peak voltmeter associated with said receiver for measuring the peak amplitude of said received signal during periodically repeated predetermined time intervals said first and second intervals having respectively fixed first and second durations $t$ and T; means for measuring the frequency corresponding to said peak amplitude; means for generating an information signal corresponding to said peak amplitude frequency; respective frequency control means in said transmitter and receiver; a return channel for transmitting said information signal to said transmitter frequency control means; clock means in said transmitter and receiver; means for synchronizing said clock means of said receiver to said clock means of said transmitter; in said transmitter and in said receiver respective carrier frequency modulating means, controlled by said clock means and by said frequency control means for cyclically tuning said frequency to sweep a predetermined frequency band according to a predetermined pattern during said predetermined periodically repeated time intervals and to be constantly equal to one of the frequencies comprised in said frequency band during further periodically repeated time intervals respectively intervening between said predetermined time intervals.

5. A tropospheric radio link comprising: a transmitter for transmitting a signal having a carrier frequency; a receiver for receiving said signal; a peak voltmeter associated with said receiver for measuring the peak amplitude of said received signal during periodically repeated predetermined time intervals said first and second intervals having respectively fixed first and second durations $t$ and T; an electronic counter; means controlled by said peak voltmeter for resetting to zero said electronic counter each time a peak higher than the preceding ones is measured; means for generating a signal corresponding to the number counted by said counter at the end of each of said time intervals; means for generating an information signal corresponding to said number; respective frequency control means in said transmitter and receiver; a return channel for transmitting said information signal to said transmitter frequency control means; clock means in said transmitter and receiver; means for synchronizing said clock means of said receiver to said clock means of said transmitter; in said transmitter and in said receiver respective carrier frequency modulating means, controlled by said clock means and by said frequency control means for cyclically tuning said frequency to sweep a predetermined frequency band according to a predetermined pattern during said predetermined periodically repeated time intervals and to be constantly equal to one of the frequencies comprised in said frequency band during further periodically repeated time intervals separating intervening respectively between said predetermined time intervals.

6. A tropospheric radio link comprising: a first transmitter for transmitting a signal having a carrier frequency; means for cyclically tuning said frequency to sweep a predetermined frequency band during first periodically repeated time intervals and to be clamped to one of the frequency values comprised in said frequency band during second periodically repeated time intervals separating two consecutive first time intervals said first and second intervals having respectively fixed first and second durations $t$ and T; a first receiver for receiving said signal; means for measuring the amplitude of said received signal during said first intervals and for determining the frequency corresponding to the peak amplitude of said signal; means for constantly tuning said receiver to said transmitter; a second transmitter similar to said first transmitter associated with said first receiver; a second receiver similar to said first receiver associated with said first transmitter; means for transmitting from said first and second receiver to said first and second transmitter respectively through said second transmitter and receiver and through said first transmitter and receiver respectively, an information signal indicating said peak amplitude frequency; and means for making said one frequency equal to said last mentioned frequency.

References Cited in the file of this patent

UNITED STATES PATENTS

| | | |
|---|---|---|
| 2,209,273 | Hills | July 23, 1940 |
| 2,521,696 | De Armond | Sept. 12, 1950 |
| 2,694,140 | Gilman et al. | Nov. 9, 1954 |
| 2,967,908 | Gray et al. | Jan. 10, 1961 |
| 3,001,064 | Alexis et al. | Sept. 19, 1961 |
| 3,054,895 | Forsyth | Sept. 18, 1962 |